(12) United States Patent
DiMarco

(10) Patent No.: US 7,955,004 B2
(45) Date of Patent: Jun. 7, 2011

(54) FIBER OPTIC FURCATION METHOD

(75) Inventor: Brian Anthony DiMarco, Greenville, SC (US)

(73) Assignee: FiberSource, Inc., Greenville, SC (US)

( * ) Notice: Subject to any disclaimer, the term of this patent is extended or adjusted under 35 U.S.C. 154(b) by 0 days.

(21) Appl. No.: 12/204,398

(22) Filed: Sep. 4, 2008

(65) Prior Publication Data

US 2010/0054678 A1    Mar. 4, 2010

(51) Int. Cl.
*G02B 6/255* (2006.01)
*G02B 6/44* (2006.01)

(52) U.S. Cl. .......................................... 385/99; 385/100

(58) Field of Classification Search ............... 385/95, 385/99, 100
See application file for complete search history.

(56) References Cited

U.S. PATENT DOCUMENTS

| | | | |
|---|---|---|---|
| 3,914,015 A | 10/1975 | McCartney | |
| 3,999,837 A | 12/1976 | Bowen et al. | |
| 4,969,705 A | 11/1990 | Stoy et al. | |
| 5,054,868 A | 10/1991 | Hoban et al. | |
| 5,208,887 A | 5/1993 | Grinderslev | |
| 5,210,812 A * | 5/1993 | Nilsson et al. | 385/100 |
| 5,217,207 A | 6/1993 | Schmader et al. | |
| 5,440,665 A | 8/1995 | Ray et al. | |
| 5,528,718 A | 6/1996 | Ray et al. | |
| 5,657,413 A | 8/1997 | Ray et al. | |
| 5,661,836 A * | 8/1997 | Sano et al. | 385/111 |
| 5,894,536 A | 4/1999 | Rifkin et al. | |
| 5,915,055 A | 6/1999 | Bennett et al. | |
| 6,104,846 A | 8/2000 | Hodgson et al. | |
| 6,174,424 B1 | 1/2001 | Wach et al. | |
| 6,326,550 B1 | 12/2001 | Dyer et al. | |
| 6,400,873 B1 * | 6/2002 | Gimblet et al. | 385/102 |
| 6,416,234 B1 | 7/2002 | Wach et al. | |
| 6,429,373 B1 | 8/2002 | Scrimpshire et al. | |
| 6,434,317 B1 | 8/2002 | Dyer et al. | |
| 6,438,299 B1 * | 8/2002 | Brown et al. | 385/100 |
| 6,498,882 B1 | 12/2002 | Buckelew et al. | |
| 6,829,424 B1 | 12/2004 | Finzel et al. | |
| 6,832,032 B2 | 12/2004 | Simmons et al. | |
| 6,909,828 B2 * | 6/2005 | Zimmel et al. | 385/100 |
| 7,090,406 B2 | 8/2006 | Melton et al. | |
| 7,090,407 B2 | 8/2006 | Melton et al. | |
| 7,111,990 B2 | 9/2006 | Melton et al. | |
| 7,266,274 B2 | 9/2007 | Elkins, II et al. | |
| 7,346,243 B2 | 3/2008 | Cody et al. | |
| 7,494,284 B2 * | 2/2009 | Robinson et al. | 385/53 |
| 2005/0259928 A1 * | 11/2005 | Elkins et al. | 385/100 |
| 2007/0212003 A1 * | 9/2007 | Lu et al. | 385/100 |
| 2008/0175548 A1 * | 7/2008 | Knecht et al. | 385/100 |

* cited by examiner

*Primary Examiner* — Ryan Lepisto
*Assistant Examiner* — Robert Tavlykaev
(74) *Attorney, Agent, or Firm* — John B. Hardaway, III; Nexsen Pruet, LLC

(57) ABSTRACT

A fiber optic furcation method for fiber optic cables having a plurality of optical fibers and a fiber optic junction made by said method. The method comprises the steps of threading each optical fiber into a separate fiber optic cable forming a junction; placing a first tube around the junction so that the tube covers the reinforcing members of the fiber optic cables; folding reinforcing fibers from the fiber optic cables over the first tube; applying an adhesive to the reinforcing fibers; placing a second tube around the junction; and shrink wrapping the junction.

17 Claims, 4 Drawing Sheets

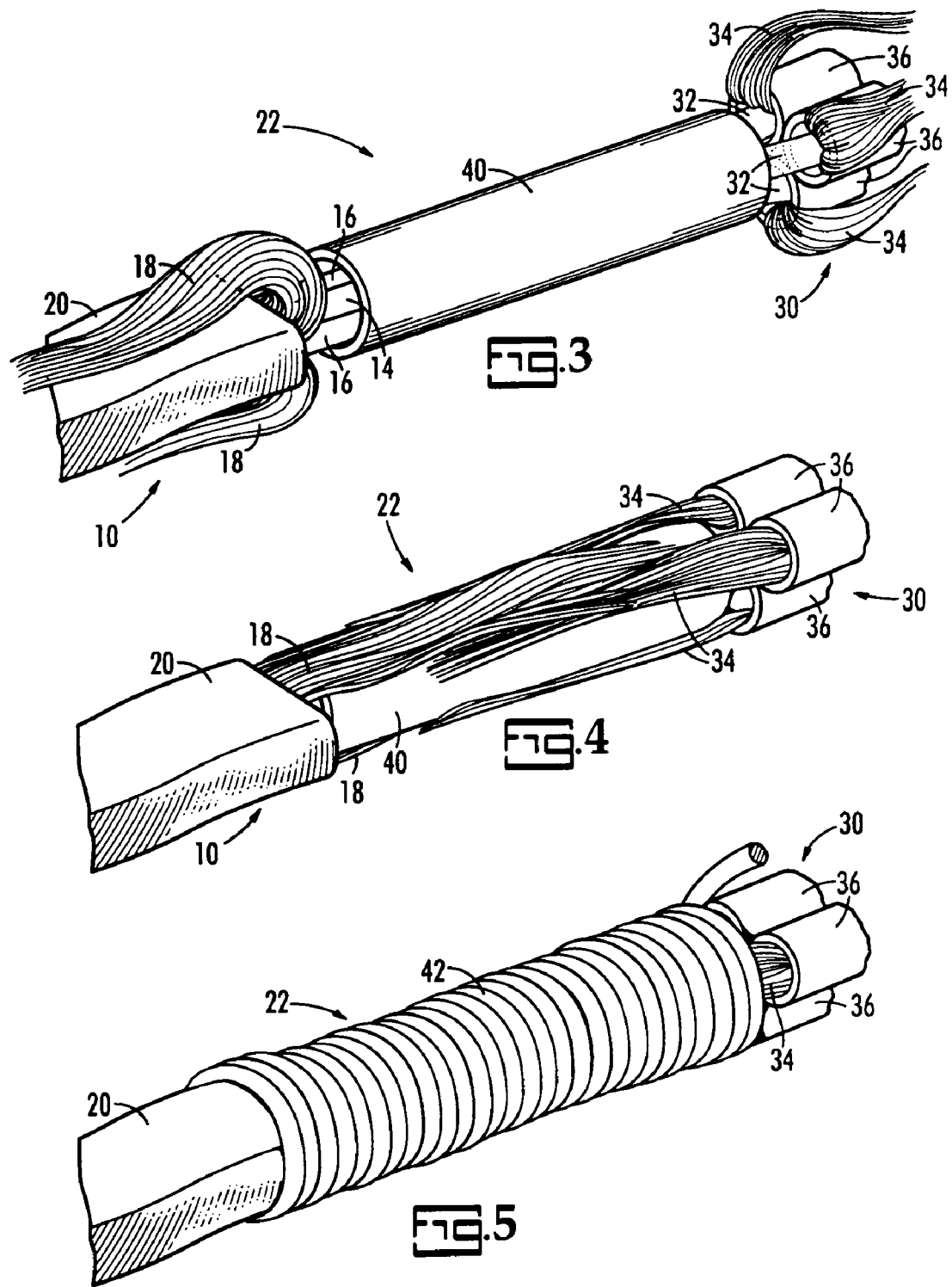

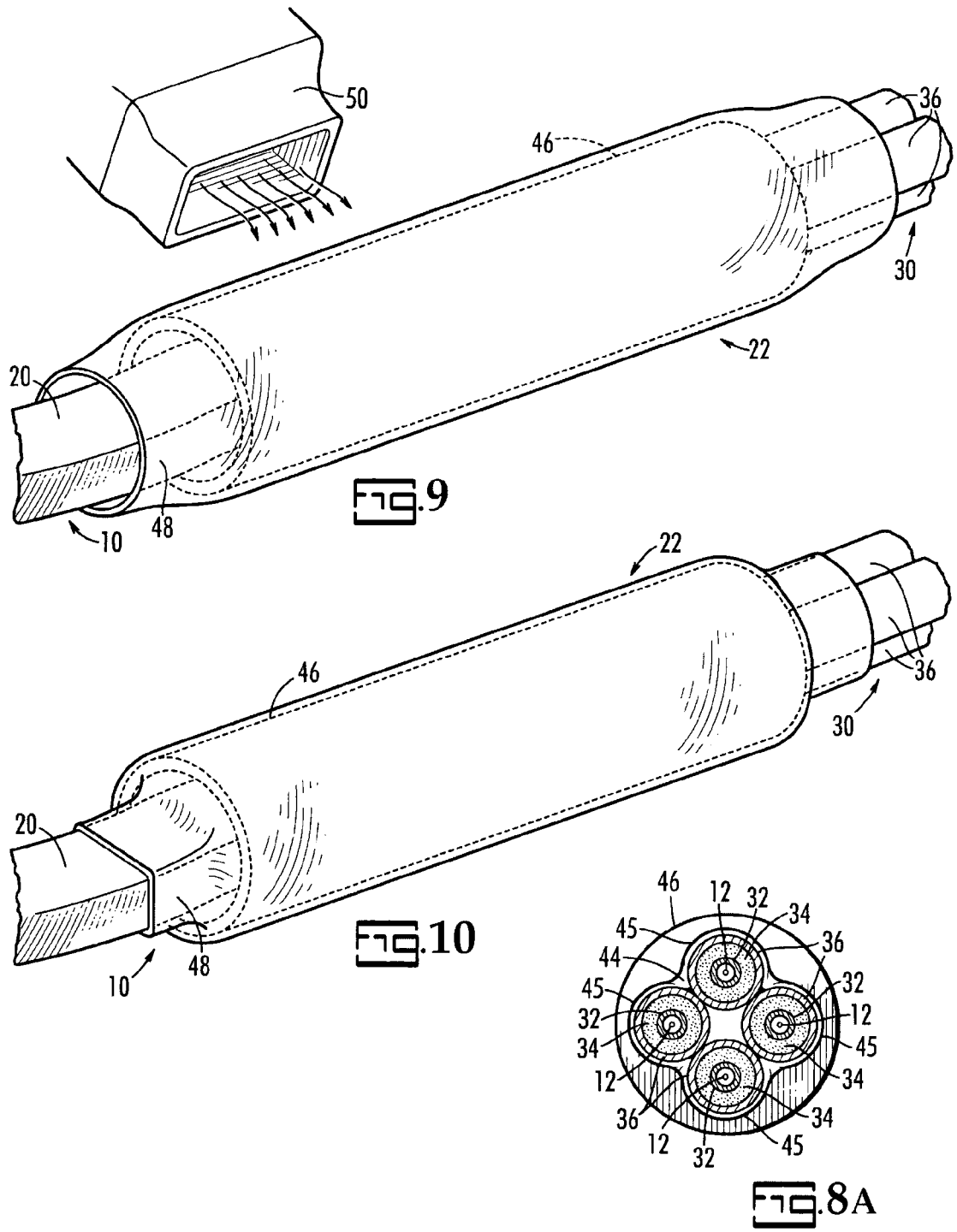

FIBER OPTIC FURCATION METHOD

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO A SEQUENCE LISTING, A TABLE, OR A COMPUTER PROGRAM LISTING COMPACT DISC APPENDIX

Not Applicable.

BACKGROUND OF THE INVENTION

This invention relates to fiber optic cable and specifically methods of furcating fiber optic cables carrying multiple optical fibers. Typical fiber optic cable is comprised of several components run together inside sheathing. First, fiber optic cable contains at least one optical fiber, which is contained in a protective tube. Next, running along side the optical fiber substantially parallel thereto are reinforcing members and reinforcing fibers or yarns. The reinforcing members are typically fiberglass rods and the reinforcing yarn is typically a strong, synthetic fiber, such as aramid.

Fiber optic cables, commonly used for communication transmissions, are often run over long distances. It is more efficient to run a single fiber optic cable containing multiple optical fibers that it is to run multiple separate fiber optic cables. A cable containing multiple optical fibers typically has all of the fibers running together, side-by-side, in a protective tube similar to that which would be used in a cable having a single optical fiber. To connect these individual optical fibers to devices, however, it is usually necessary to separate the optical fibers into individual cables carrying a single optical fiber each. The individual cables are then terminated with hardened fiber optic connectors.

The junction between the fiber optic cable carrying multiple fibers and the fiber optic cables carrying the individual fibers must be strong and watertight. At the same time, the junction must provide room for the optical fibers to bend as the fiber optic cables expand and contract. A method of creating such a junction should also be simple to execute and should not involve the use of a large number of specialized parts or pieces.

Accordingly, there is a need for a simple and reliable method of furcating a fiber optic cable containing multiple optical fibers that results in a sealed and strong junction that permits the optical fibers to bend as the fiber optic cables expand and contract.

BRIEF SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. Its sole purpose is to present some concepts of the invention in a simplified form as a prelude to the more detailed description that is presented later.

According to its major aspects and briefly stated, the furcation method of the present invention transitions a single fiber optic cable carrying multiple optical fibers to multiple fiber optic cables, each carrying a single optical fiber. The junction created by the method of the present invention is durable, watertight, and allows the optical fibers room to bend and absorb the periodic expansion and contraction of the cable.

The first step in the method of the present invention is to thread the individual optical fibers of the cable carrying multiple optical fibers into individual fiber optic cables carrying only one optical fiber each. This junction is then covered with a first tube. Specifically, the first tube covers the junction between the cable carrying multiple optical fibers and the cables carrying single optical fibers and extends over a portion of the reinforcement members of the cable carrying multiple optical fibers.

Next, the reinforcing fibers of the cable carrying multiple optical fibers are folded over the first tube toward the cables carrying individual optical fibers. The reinforcing fibers of the multiple cables carrying individual optical fibers are then folded the opposite way over the first tube and toward the cable carrying multiple optical fibers. To secure the reinforcing fibers in this arrangement, wire is wrapped around the reinforcing fibers securing them in place against the first tube. The entire junction, including the first tube and reinforcing fibers, are then coated in an adhesive, such as epoxy. The layer of adhesive adds strength and durability to the junction and also makes the junction water tight.

After the adhesive is applied, a second tube is brought over the junction to provide further protection and stiffening and finally the entire junction is covered in heat shrink tubing. In one embodiment of the present invention, the heat shrink tubing has a layer of adhesive on its inner surface. The resulting junction is strong and durable enough to protect the optical fibers while at the same time allowing the optical fibers room to flex when the cables expand and contract.

Other features and advantages of the present invention will be apparent to those skilled in the art from a careful reading of the Detailed Disclosure of the Preferred Embodiment presented below and accompanied by the drawings.

BRIEF DESCRIPTION OF THE DRAWINGS

One embodiment of the present invention is illustrated by the accompanying drawings, in which:

FIG. 3 shows the junction with the optical fibers, reinforcing members, and protective tubes all fully inserted into the first tube in accordance with one embodiment of the present invention.

FIG. 4 shows the junction with the reinforcing fibers from both the fiber optic cable having multiple optical fibers and the four fiber optic cables carrying the individual optical fibers folded over the first tube in accordance with one embodiment of the present invention.

FIG. 5 shows the junction with wire wrapped around the reinforcing fibers and first tube in accordance with one embodiment of the present invention.

FIG. 8A, taken at view lines 8A of FIG. 8, shows the radii in the end of the outer tube.

FIG. 9 shows the junction with the heat shrink tubing in place over the second tube and with the heat shrink tubing in an un-shrunk condition in accordance with one embodiment of the present invention.

FIG. 10 shows the junction after the heat shrink tubing has been shrunk to the cables and second tube in accordance with one embodiment of the present invention.

DETAILED DESCRIPTION OF THE PREFERRED EMBODIMENT

The present invention is a furcation method for use with fiber optic cables. More specifically, the present invention is a method of transitioning a fiber optic cable carrying multiple optical fibers to multiple fiber optic cables carrying single optical fibers. This method does not require the use of specialized tools or parts and results in a junction that is watertight, strong and durable, and provides sufficient room for the optical fibers therein to flex as the cables expand and contract.

Figure 1:
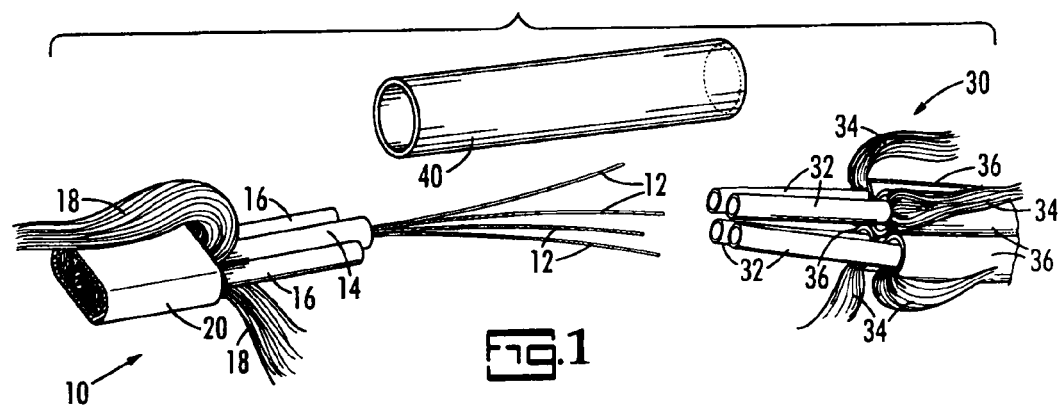
FIG. 1 shows a fiber optic cable carrying four optical fibers, the first tube of the present invention, and four fiber optic cables with protective tubes waiting to receive the four optical fibers in accordance with one embodiment of the present invention.

FIG. 1 shows a fiber optic cable 10 carrying four optical fibers 12. The optical fibers 12 are contained within a protective tube 14. Running along side protective tube 14 are reinforcing members 16 and reinforcing fibers 18. Reinforcing members 16 are typically made of a stiff but flexible material such as fiber glass. Reinforcing fibers 18 are often comprised of a strong synthetic fiber such as aramid. All of the components of the fiber optic cable 10 are contained in sheathing 20. Also shown in FIG. 1 are the four individual fiber optic cables, designated collectively here as reference character 30, designed to carry the four optical fibers 12. The four fiber optic cables 30 also contain protective tubes 32 and reinforcing fibers 34. All of these components are contained in sheathing 36.

Finally, also in FIG. 1 is first tube 40. First tube 40 is designed to surround the junction between the fiber optic cable 10 carrying multiple optical fibers 12 and the four fiber optic cables 30 into which the optic fibers 12 will be threaded. First tube 40, which will protect optical fibers 12 while at the same time affording the optical fibers 12 sufficient room to bend and flex when the fiber optic cables 10 and 30 expand and contract, can be made of any substantially rigid materials, just as plastic, metal, wood, carbon fiber, PVC, or glass.

Figure 2:
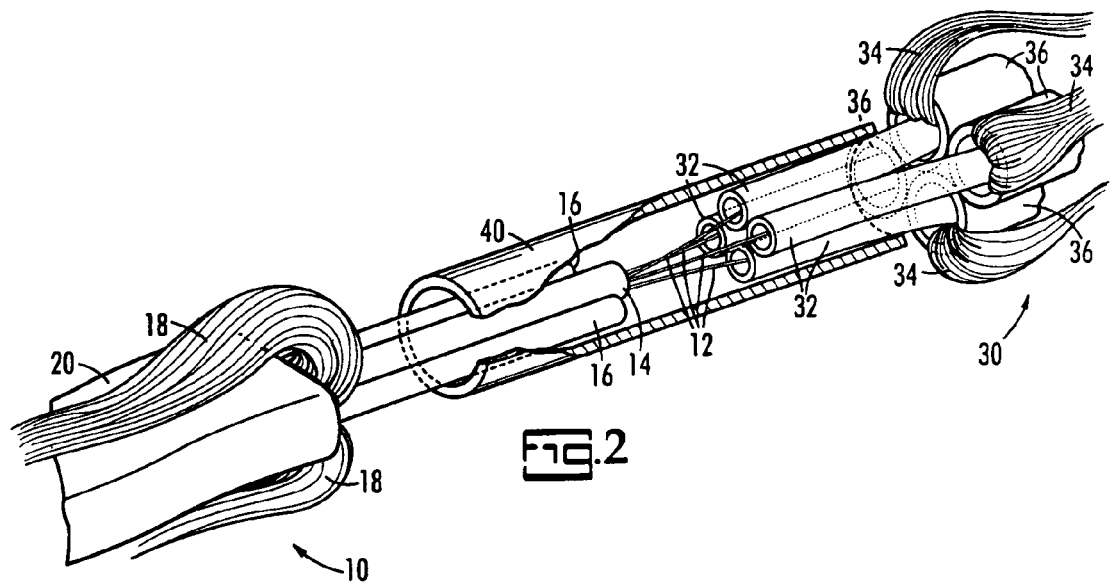
FIG. 2 shows the junction after the optical fibers have been threaded into the protective tubes of the four fiber optic cables and the first tube (shown in cutaway) has been brought over the junction in accordance with one embodiment of the present invention.

FIG. 2 shows the protective tube 14 and reinforcing members 16 of fiber optic cable 10 inserted into first tube 40, shown in cutaway. Protective tubes 32 emanating from the four fiber optic cables 30 are also inserted into first tube 40. Note that in FIG. 2 the optical fibers 12 have been threaded into the protective tubes 32. Note also that the reinforcing fibers 18 and 34 are not inserted into first tube 40. FIG. 3 is similar to FIG. 2 but shows the components (except for the reinforcing fibers) fully inserted into first tube 40 such that the sheathing 20 and 26 of the fiber optic cables 10 and 30 approaches the ends of first tube 40. The fiber optic cable components are now positioned such that they form a junction 22.

FIG. 4 shows the reinforcing fibers 18 and 34 of fiber optic cables 10 and 30 folded over the first tube 40. Note that in this embodiment of the present invention, the reinforcing fibers 18 and 34 are sufficiently long to enable them to intermingle, strengthening the bond that results after the wire (FIG. 5) and adhesive (FIG. 6) are applied to the junction 22.

Figure 6:
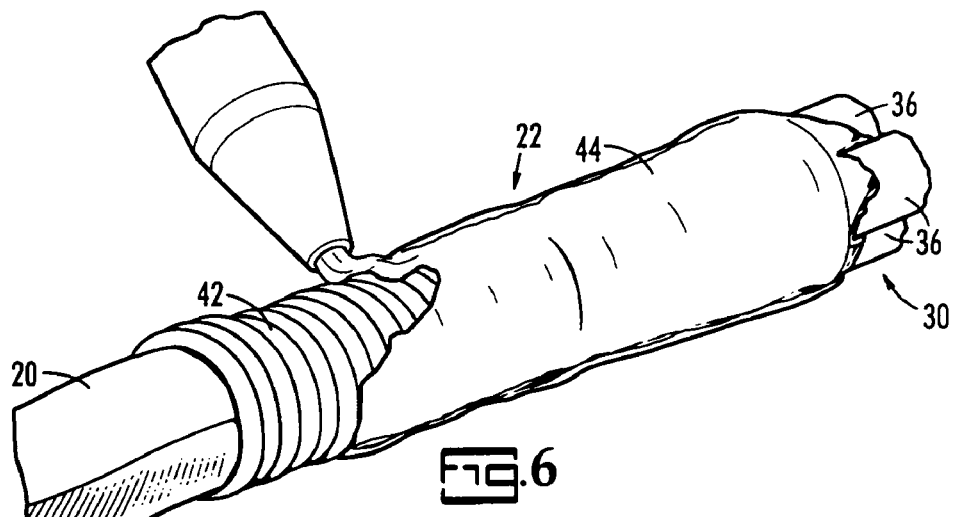
FIG. 6 shows adhesive being applied to the wire and reinforcing fibers covering the junction in accordance with one embodiment of the present invention.

FIG. 5 shows the reinforcing fibers 18 (FIG. 4) and 34 after wire 42 has been wrapped around junction 22, including the reinforcing fibers 18 and 34. Although wire is shown in this particular embodiment of the invention, other embodiments of the present invention use string, twine, monofilament line, or aramid thread. Wire 42 serves both to strengthen the junction 22 and to hold the reinforcing fibers 18 and 34 in place prior to and during the application of adhesive (FIG. 6) to the fibers. FIG. 6 shows an adhesive 44 being applied over wire 42 and reinforcing fibers 18 and 34 (FIG. 4). In one embodiment of the present invention, the adhesive 44 is epoxy. The first tube 40 (FIG. 3) along with the reinforcing fibers 18 and 34 (FIG. 4) and wire 42 serve as the substrate for the adhesive 44 creating a rigid and strong junction 22 between fiber optic cables 10 and 30. The adhesive 44 also makes the junction 22 water tight.

Figure 7:
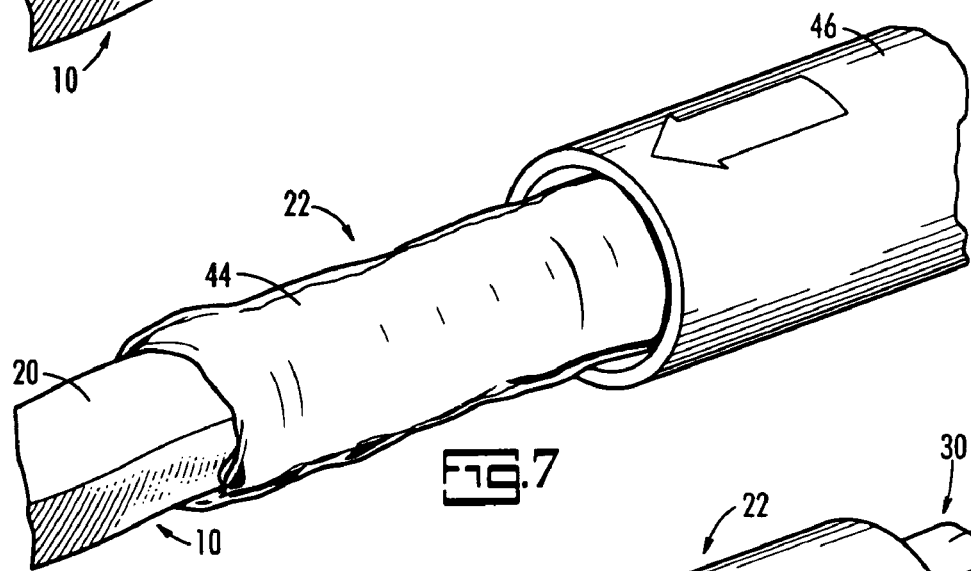
FIG. 7 shows a second tube being slipped over the junction after the adhesive has been applied in accordance with one embodiment of the present invention.
Figure 8:
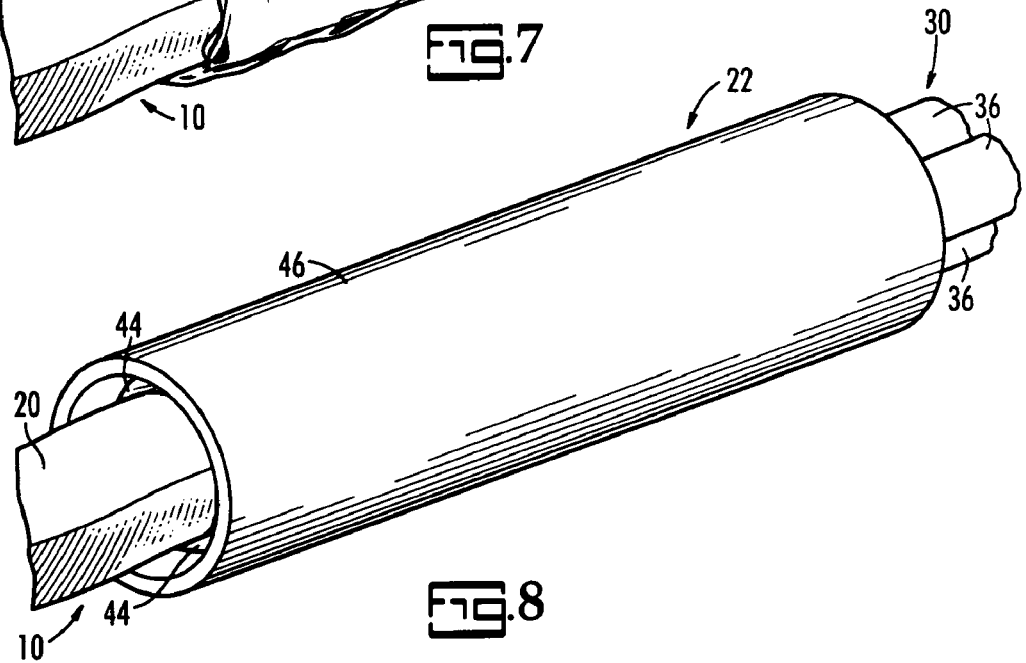
FIG. 8 shows the second tube in place over the junction prior to the junction being heat wrapped in accordance with one embodiment of the present invention.

FIGS. 7 and 8 show a second outer tube 46 being placed over the junction 22. The outer tube 46, which can be made of any rigid material, provides a smooth surface for the heat shrink tubing 48 (FIGS. 9 and 10) to grip. The outer tube 46 can be made of any rigid material, such as metal, PVC, glass, wood, and plastic, including injection molded plastic. In one embodiment of the present invention (FIG. 8A), the outer tube 46 has four radii 45 at the end at which the four fiber optic cables 30 enter the outer tube 46 to assist in aligning and arraying the four fiber optic cables 30 about the longitudinal axis of outer tube 46.

FIGS. 9 and 10 show the junction 22 with heat shrink tube 48 placed over outer tube 46. In FIG. 9, heat shrink tube 48 is in position but has not yet been shrunk to outer tube 46 and sheathing 20 and 36. In one embodiment of the present invention, the inside surface of heat shrink tube 48 is coated with an adhesive to bond it to both outer tube 46 as well as fiber optic sheathing 20 and 36. Note that heat shrink tube 48 is longer than outer tube 46 so that portions of the heat shrink tube 48 that extend beyond outer tube 46 shrink to the sheathing 20 and 36 of fiber optic cables 10 and 30, further sealing off the junction 22 from dirt, water, or other debris.

Those skilled in the art of fiber optic cable furcating, junctions, and connectors will recognize that many substitutions and modifications can be made in the foregoing preferred embodiments without departing from the spirit and scope of the present invention.

What is claimed is:

1. A method of furcating a fiber optic cable having a first plurality of optical fibers contained in a protective tube into a second plurality of fiber optic cables each carrying a single optical fiber in a protective tube, said method comprising the steps of:

threading said first plurality of optical fibers into said protective tubes of said second plurality of fiber optic cables forming a junction wherein said first plurality of optical fibers are exposed between said protective tube of said fiber optic cable having a said first plurality of optical fibers and said protective tubes of said second plurality of fiber optic cables;

placing a first tube around said junction so that said first tube covers said protective tube and reinforcing members from said fiber optic cable having said first plurality of optical fibers and said protective tubes from said second plurality of fiber optic cables, said first tube dimensioned to allow said exposed optical fibers inside said junction to bend as said fiber optic cables expand and contract;

folding reinforcing fibers from said fiber optic cable having said first plurality of optical fibers over said first tube;

folding reinforcing fibers from said second plurality of fiber optic cables over said first tube thereby overlapping said reinforcing fibers from said fiber optic cable having said first plurality of optical fibers and said reinforcing fibers from said second plurality of fiber optic cables;

wrapping said overlapped reinforcing fibers so that said reinforcing fibers are secured to said first tube when an adhesive is applied to said reinforcing fibers;

applying said adhesive to said reinforcing fibers; and placing a rigid outer tube over said adhesive.

2. The method of claim 1 wherein said reinforcing fibers are wrapped with wire.

3. The method of claim 1 wherein said reinforcing fibers are wrapped with aramid thread.

4. The method of claim 1 wherein said reinforcing fibers are wrapped with string.

5. The method of claim 1 wherein said first tube is made of metal.

6. The method of claim 1 wherein said first tube is made of plastic.

7. The method of claim 1 wherein said adhesive is epoxy.

8. The method of claim 1 wherein said outer tube has an opening with an inner surface and said inner surface of said opening has a plurality of radii arrayed within said opening to align said second plurality of fiber optic cables symmetrically about the longitudinal axis of said outer tube.

9. The method of claim 1 wherein the outer tube is made of metal.

10. The method of claim 1 wherein the outer tube is made of plastic.

11. The method of claim 1 wherein the outer tube is made of injection-molded plastic.

12. The method of claim 1, further comprising the steps of:

placing a heat shrink tube over said outer tube, said outer tube having a longitudinal dimension and said heat shrink tube having a longitudinal dimension greater than said longitudinal dimension of said outer tube; and shrinking said heat shrink tube to said outer tube and said fiber optic cables thereby sealing said junction.

13. The method of claim 12 wherein said heat shrink tube has an inner surface, said inner surface being coated with an adhesive.

14. The method of claim 1 wherein said reinforcing members are fiber glass rods.

15. The method of claim 1 wherein said reinforcing fibers are synthetic fibers.

16. The method of claim 1 wherein said reinforcing fibers are aramid fibers.

17. A junction between a fiber optic cable having a first plurality of optical fibers contained in a protective tube and a second plurality of fiber optic cables each carrying a single optical fiber in a protective tube, said junction made according to a method comprising the steps of:

threading said first plurality of optical fibers into said protective tubes of said second plurality of fiber optic cables forming a junction wherein said first plurality of optical fibers are exposed between said protective tube of said fiber optic cable having said first plurality of optical fibers and said protective tubes of said second plurality of fiber optic cables;

placing a first tube around said junction so that said first tube covers said protective tube and reinforcing members from said fiber optic cable having said first plurality of optical fibers and said protective tubes from said second plurality of fiber optic cables, said first tube dimensioned to allow said exposed optical fibers inside said junction to bend as said fiber optic cables expand and contract;

folding reinforcing fibers from said fiber optic cable having said first plurality of optical fibers over said first tube;

folding reinforcing fibers from said second plurality of fiber optic cables over said first tube thereby overlapping said reinforcing fibers from said fiber optic cable having said first plurality of optical fibers and said reinforcing fibers from said second plurality of fiber optic cables;

wrapping said overlapped reinforcing fibers so that said reinforcing fibers are secured to said first tube when an adhesive is applied to said reinforcing fibers;

applying said adhesive to said reinforcing fibers; and placing a rigid outer tube over said adhesive.

* * * * *